United States Patent [19]

Sepp et al.

[11] 4,035,081

[45] July 12, 1977

[54] LASER GYROSCOPE

[75] Inventors: Gunther Sepp, Ottobrunn; Gunthard Born, Taufkirchen, both of Germany

[73] Assignee: Messerschmitt-Bolkow-Blohm GmbH, Munich, Germany

[21] Appl. No.: 640,888

[22] Filed: Dec. 15, 1975

[30] Foreign Application Priority Data

Dec. 21, 1974  Germany .......................... 2460806

[51] Int. Cl.² .......................................... G01B 9/02
[52] U.S. Cl. ...................... 356/106 LR; 331/94.5 S
[58] Field of Search .......... 356/106 LR; 331/94.5 S

[56] References Cited

U.S. PATENT DOCUMENTS

| 3,468,608 | 9/1969 | Doyle | 356/106 LR |
| 3,581,227 | 5/1971 | Podgorski | 356/106 LR |
| 3,743,962 | 7/1973 | Rosenberg | 356/106 LR |
| 3,892,486 | 7/1975 | Ferrar | 356/106 LR |

*Primary Examiner*—Vincent P. McGraw
*Attorney, Agent, or Firm*—W. G. Fasse; W. W. Roberts

[57] ABSTRACT

In a laser gyroscope it is desirable for precision operation to eliminate or effectively compensate temperature variations, as well as manufacturing tolerances. To this end the present laser gyroscope has two ring lasers physically arranged so close to each other that there is an optimal thermic contact between the two ring lasers. Temperature sensors are arranged in contact with the resonator circumference to control a piezoelectric resonator tuning device in response to temperature variations to compensate the same. The modulators of the lasers are periodically switched, for example, with the aid of Faraday cells to reverse the travel direction of the travelling waves to thereby compensate for manufacturing tolerances, and any remaining temperature variations.

15 Claims, 6 Drawing Figures

LASER GYROSCOPE

BACKGROUND OF THE INVENTION

The present invention relates to laser gyroscopes employing two ring lasers arranged in two planes, one above the other, and relative to a common reference axis extending perpendicularly to the two planes, which in turn extend in parallel to each other. The two lasers operate independently of each other and do not influence each other. The radiation generating device may be a solid state laser and/or a gas laser, whereby in both instances the resonators of the lasers are constructed as wave guides. An article entitled "The Laser Gyro" by B. J. Kilpatrick and published in "IEEE Spectrum", October 1976, 1967, general background information.

German Patent Publication DAS No. 1,961,121 describes a ring laser device for measuring angular speeds. In this known device the sensitivity for the measuring of small angular speeds is improved and the time required for the measuring is substantially reduced due to the fact that two ring lasers which are independent of each other are arranged in two planes one above the other. Each of these ring lasers is equipped with electro-optical elements in such a manner that the waves in each of the two ring lasers can travel only in one direction. Since the two lasers of this known device work independently of each other, the device avoids the so called "lock-in" effect. However, such effect may occur where the resonance frequencies, which are shifted due to the rotation and which are located very close to each other, effectively oscillate with a common frequency. Thus, as the result of the so called lock-in effect, it is not possible to produce a difference frequency as the result of the rotation. As mentioned, the device according to German Patent Publication No. 1,961,121 avoids the so called lock-in effect. However, the known apparatus has the disadvantage that the paths or trajectories of the two travelling waves propagating or moving in opposite directions are not automatically equal to each other. Moreover, the length of these paths or trajectories varies with time due to thermal deformations of the materials of which the resonators are made. Thus, the differences in the lengths of these trajectories also vary with time. For these reasons it is not possible to achieve a measuring result free of faults.

German Patent Publication DOS No. 2,044,575 discloses a similar laser gyro in which two independent, linear lasers are arranged in the same plane, but in an opposite sense in order to achieve measuring times which are as short as possible. Each of the two lasers shows up a Doppler-broadening which is different the one of the other and each of the emitted beams travels only through the path of a half-ring interferometer. Thus, here again a measuring result free of faults cannot be achieved.

Substantially all prior art gyros use HeNe-lasers constructed in a ring configuration and achieve a sensitivity of a few arc seconds, whereby the dimensions are typically within the range of three to fifteen centimeters and wherein the continuous duty drift is within the range of 0.003 to 10° per hour. However, in order to achieve this type of precision and sensitivity it is necessary to use optical elements of the highest precision. In addition, it is necessary to employ a plurality of complicated compensating techniques, as well as to take into account predetermined allowances.

OBJECTS OF THE INVENTION:

In view of the foregoing, it is the aim of the invention to achieve the following objects singly or in combination:

to overcome the drawbacks of the prior art, more specifically, to construct a laser gyroscope in which measuring errors are substantially eliminated;

to compensate for the unequality of the trajectories of the two travelling waves propagating in opposite directions;

to compensate the time variations of said trajectories resulting from the thermal deformation of the material of which the laser resonators are made;

to construct a laser gyroscope in such a manner that the heretofore required highest precision of the optical elements as well as the extreme care in the production are substantially reduced;

to avoid the need for complicated compensation techniques and the determination of allowances;

to substantially reduce the production costs for laser gyroscopes so that their use becomes feasible, for example, in missiles having a relatively short flight duration; and to compensate not only for differences in the length of the trajectories of the travelling waves resulting from temperature variations and varying with time, but also to compensate for such differences in the trajectories which are fixed and the result of manufacturing tolerances.

SUMMARY OF THE INVENTION

According to the invention there is provided a laser gyroscope in which the two ring lasers are arranged immediately one above the other to provide for an optimal thermic contact therebetween. The resonators of the two ring lasers are constructed as wave guides, and temperature sensing means are arranged in such a manner as to ascertain temperature variations which are utilized to control the piezoelectric tuning of the resonators. Further, so called loss or dissipation modulators, for example, in the form of Farraday cells are employed for periodically changing the propagation direction of the travelling waves. The combination of the just recited features eliminates the above enumerated drawbacks of the prior art. In addition, the combination of features as taught by the invention substantially reduces the high precision of the optical elements as well as the extreme care in the production heretofore necessary.

According to a further feature of the invention, the active means may comprise $CO_2$ wave guide lasers or a solid state laser employing the so called integrated optical construction. This type of construction as such, is known in the art. Integrated optical construction employs a substrate supporting a thin layer or strip constituting a light conductor. The electromagnetic wave is guided in this thin layer or strip provided the indices of refraction are suitably selected. Usually the substrate and the thin layer or strip are transparent.

In the embodiment where the laser means comprise solid state lasers, the resonators will also have wave guide characteristics. Compared to the HeNe ring laser, the solid state ring lasers and the $CO_2$ ring lasers, both with wave guides, have several advantages. Thus, due to the wave guide characteristics of the resonators, a displacement of the laser beam within the resonator is not possible. As a result, any variation of the beam trajectory due to beam displacement is also eliminated. Furthermore, the high amplification possible by both types of lasers (solid state laser and $CO_2$ wave guide laser) eliminate the previous requirement for using elements of the highest optical quality with regard to the modulators and the resonator mirrors. This advantage of the invention is further enhanced in connection with the $CO_2$ laser due to the fact that its wavelength is seventeen times larger than the wavelength, for example, of a HeNe laser. For the same reasons the laser according to the invention also does not require the precise maintaining of the proper transmission of the coupling mirror.

In both instances, that is, where the invention employs solid state lasers, as well as $CO_2$ wave guide lasers, two compensations are employed in combination according to the invention. One compensation is accomplished by adjusting the position of the laser mirrors automatically in response to temperature variations. Such temperature variations are converted by conventional means into a control signal which in turn actuates the piezoelectric adjustment mechanism, whereby trajectory variations caused by temperature changes are compensated. The other compensation is accomplished, for example, by means of Farraday cells which are used to periodically change the direction of travel of the travelling waves in the individual ring lasers. The second compensation takes into account any remaining trajectory differences resulting from temperature variations, as well as fixed trajectory differences resulting from manufacturing tolerances.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figures 1, 2, 3:
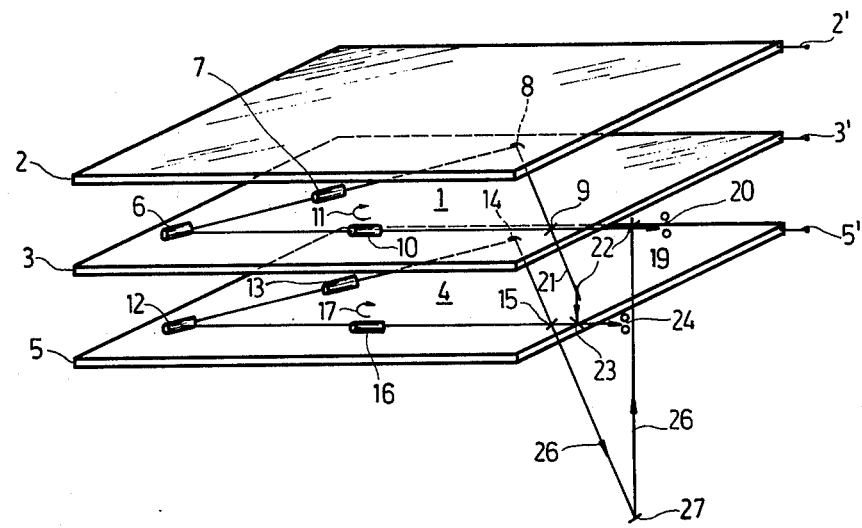
FIG. 1 is a simplified perspective illustration of a double laser gyroscope.
FIG. 2 is a simplified sectional illustration through a $CO_2$ wave guide laser gyroscope.
FIG. 3 illustrates a solid state laser gyroscope partially in section and in a simplified, schematic illustration.
Figure 4:
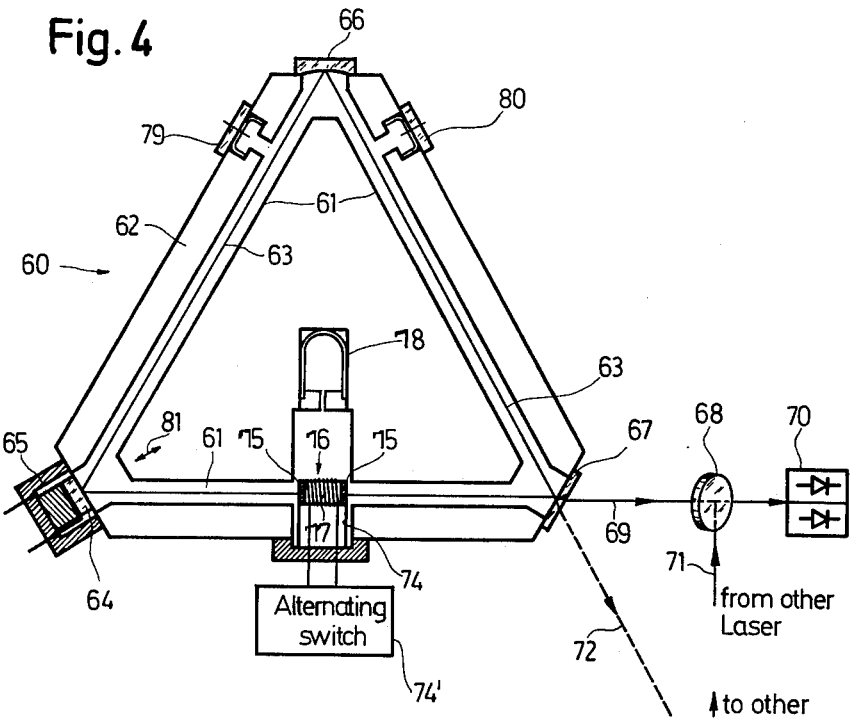
FIG. 4 illustrates a plan view of a ring laser, two of which are used in the illustration of FIG. 1.

FIG. 1 illustrates a simplified basic perspective view of a gyroscope according to the invention employing two ring lasers. The first ring laser 1 is located between two temperature sensing members 2 and 3. The second laser 4 is located between the temperature sensors 3 and 5. The temperature sensors 2, 3 and 5 are of conventional construction and may, for example, comprise so called NTC (PTC) resistors also known as negative (positive) temperature coefficient resistors. The laser 1 comprises a piezoelectrically driven reflecting mirror 6, a modulator 7, a resonator mirror 8, a coupling mirror 9 and an amplifying medium 10. The just described elements 6, 7, 8, 9, and 10 are interconnected with each other by wave guide means to form a ring laser, as shown in FIG. 4. The wave travelling in the ring laser 1 is symbolized by the rotational arrow 11.

The second laser 4 is similarly constructed and comprises a piezoelectrically driven reflecting mirror 12, a modulator 13, a resonator mirror 14, a coupling mirror 15 and an amplifying medium 16. The wave travelling in laser 4 is symbolically indicated by the rotational arrow 17.

A first beam 18 coupled out from the first ring laser 1 by the coupling mirror 9 passes through a so called beam splitter 19 to the detector 20 of the first ring laser 1. The second beam 21 also coupled out through the coupling mirror 9 from the ring laser 1 is deflected by a deflector 22 onto a further beam splitter 23, which in turn directs the second beam 21 onto a second detector 24. Similarly, a first beam 26 coupled out from the second ring laser 4 by the coupling mirror 15 is directed onto the beam splitter 23 and from the beam splitter 23 to the second detector 24. A second beam 26 coupled out from the second ring laser 4 by the coupling mirror 15 is directed onto a deflector 27 which directs the beam 26 onto the beam splitter 19, whereby the two beam portions of the travelling wave 11 and the travelling wave 17 are brought to an interference in the detector 20. Similarly, the beam splitter 23 brings the respective beam portions from the travelling wave 11 and the travelling wave 17 to interference in the detector 24, when the direction is reversed.

In the illustration of FIG. 1 the temperature sensors 2, 3 and 5 are so dimensioned as to at least cover a portion of the respective ring laser, whereby each laser may be sandwiched between two temperature sensors extending in parallel planes. The output signals from the temperature sensors 2, 3 and 5 are derived at respective output terminals 2', 3' and 5'.

Figure 6:
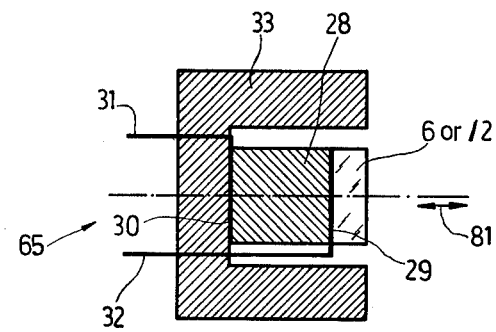
FIG. 6 shows a piezoelectric device for adjusting the position of the reflecting mirror or mirrors in the lasers according to the present invention.

The amplifying media symbolized by the amplifiers 10 and 16 are distributed substantially over the entire ring resonator or over a portion thereof. The mirrors 6 and 12 are secured to a respective ceramic block 28 as shown in FIG. 6. The piezoelectric, ceramic block 28 is arranged between electrodes 29 and 30 which in turn are connected to input terminals 31 and 32. These input terminals 31 and 32 are connected, if desired, through suitable conventional electronic means to receive the control signals derived from the output terminals 2', 3', or 5'. The piezoelectric ceramic block 28 with its mirror 6 or 12 is preferably arranged inside a housing 33 made of a material having a low temperature expansion coefficient. A material known under the trade name "Cervit" is suitable for this purpose. Similarly, so called ULE quartz is also suitable for this purpose, since it has a "ultra-low expansion" coefficient. The housing 33 is then secured to the respective ring laser 1 or 4 in a conventional manner.

The electronic control means for producing a control signal for the piezoelectric ceramic block 28 form the output signals of the temperature sensors 2, 3 and 5 are well known in the art. The control signal is computed from the temperature distribution measured by the temperature sensors in order to adjust the resulting optical trajectory.

Incidentally, the resonator mirrors 8 and 14 shown in FIG. 1 are concave mirrors, as best seen in FIG. 4. Reflecting mirrors 6 and 12 and the coupling mirrors 9 and 15 are plane, the latter two passing the respective waves as shown in FIG. 4.

In the rather simplified illustration of FIG. 1, the symbolized modulators 7 and 13 are arranged on the one hand between the mirrors 6, 12, which are adjustable in their position, and on the other hand, the concave resonator mirrors 8 and 14. However, these modulators 7, 13, respectively may be arranged between the concave mirrors 8, 14 and the respective coupling mirrors 9 and 15. According to a further possibility, the modulators 7 and 13 may be arranged between the coupling mirrors 9 and 15 on the one hand and the position adjustable mirrors 6, 12 on the other hand.

In operation, the deflecting mirrors 22 and 27 guide the beams of their respective ring laser onto the corresponding beam splitter 19 and 23 whence the beams of both ring lasers are directed onto the detectors 20 and 24, each of which comprises actually a pair of detectors, wherein the interference between the two beams is detected. As mentioned, the temperature sensors 2, 3 and 5 control the position of the reflecting mirrors 6 and 12 in response to the thermally caused variations in the trajectory of the laser beams, whereby these variations which cause errors, or rather their differences are compensated. As described above, the invention provides a further compensation of errors which might have remained even after the just mentioned compensation. Such further compensation eliminates any thermally caused deformations as well as fixed trajectory differences resulting from manufacturing tolerances of the two ring resonators of the lasers 1 and 4. The second compensation is accomplished by periodically switching the direction of propagation of the travelling waves 11 and 17 by means of the modulators 7 and 13 respectively.

Said modulators are also referred to as so called loss or dissipation modulators and may be embodied by Faraday cells with respective polarizers, both of which are well known in the art. Reference is made in this connection to an article by D. A. Guidice, and W. L. Harmon "Ring Laser Techniques for Angular Rotating Sensing", Tenth Annual Air Force Science and Engineering Symposium, October 1963, Aeronautical Systems Division, Air Force Systems Command, Wright Patterson Air Force Base, Dayton, Ohio.

FIG. 2 illustrates a simplified sectional view through a $CO_2$ wave guide laser embodying the invention. Two $CO_2$ wave guide lasers 34 and 35 are arranged in parallel to each other. Each laser is located between thin layers 36, 37 of a material having a low heat expansion coefficient. The above mentioned material, such as Cervit and ULE quartz would be suitable for this purpose. Temperature sensors 38 and 40 are arranged to contact the outer surfaces of the laser sandwich. A further temperature sensor 39 is sandwiched between the two laser arrangements. Thus, the structure is similar to that illustrated in FIG. 1. A reflecting mirror 41 adjustable in its position by piezoelectric means as described above in response to temperature changes is arranged in the $CO_2$ laser 34. Similarly, a reflecting mirror 42 also adjustable as described is arranged in the $CO_2$ laser 35. The $CO_2$ laser 34 comprises a discharge tube 43 containing the amplifying medium. A modulator 44 is arranged in the discharge tube 43. Similarly, the laser 35 comprises a discharge tube 45 with its respective amplifying medium therein and with a modulator 46. The laser 34 is provided with output means including a coupling mirror 47, a deflector mirror 48, a beam splitter 49, and a pair of detectors 50. The details of these elements will be described with reference to FIG. 5. Similarly, the laser 35 is provided at its output with a coupling mirror 51, a deflecting mirror 52, a beam splitter 53 and a pair of detectors 54.

FIG. 3 illustrates in a schematic manner a side view of a solid state laser gyroscope employing integrated optical construction. The ring lasers 55, 56 are arranged or sandwiched between thin separating layers 57. These separating layers will again comprise a material having a low temperature expansion coefficient. Each laser is provided with the respective temperature sensing elements, not shown, but secured to the respective separating layers. The optical output means 58 also constructed in an integrated optical manner, and including coupling mirrors, as well as beam combining optical means and detectors are combined with the two lasers in an integral manner and the entire structure is secured to a substrate 59 also made of ULE quartz or similar material.

FIG. 4 illustrates in more detail a ring laser device 60. A pair of such devices would be used, for example, in an embodiment as illustrated in FIG. 1. A ring shaped wave guide 61 is supported on a substrate 62 of ULE quartz or some other material having a low temperature expansion coefficient. The travelling wave 63 travels in the wave guide 61 for example in the counterclockwise direction as shown, if the laser device 60 represents, for example, the laser 4 of FIG. 1. The reflecting mirror 64 is adjustable in its position by a piezoelectric device 65 shown in more detail in FIG. 6. A concave resonator mirror 66 is arranged in the upper corner of the ring shaped laser device 60. A coupling mirror 67 is arranged in the lower right hand corner. A beam splitter or beam combining device 68 is arranged to transmit the outcoupled beam 69 to a pair of detectors 70. The beam combining device 68 also receives a beam 71 from the respective other laser device as explained above with reference to FIG. 1. Similarly, the out coupled beam 72 is deflected by a deflector 73 in order to be combined with the respective beam from the other laser. In view of the foregoing remarks, it will be appreciated that the waves in the two cooperating lasers travel in opposite directions.

The detector pair 70 could, for example, be of the type as described in the above first mentioned reference, "IEEE Spectrum", October 1967. These detectors are well known in the art and ascertain the speed, as well as travel direction of the interference strip pattern of the two travelling wave propagating in opposite directions, thus establishing the rotation of the laser gyroscope. In connection with $CO_2$ lasers, one would preferably use pyroelectric detectors or HgCdTe-detectors. Photodiodes or avalanche diodes would be employed as detectors in connection with solid state lasers.

As shown in FIG. 4, a modulator 74 is arranged in the lower leg of the ring wave guide 61. Incidentally, the modulator could be arranged in any of the legs of the ring wave guide. The modulator 74 comprises two so called $\lambda/4$ — platelets 75 and a magneto optical crystal 76 arranged between the crystals 75 and surrounded by a magnetic coil 77. The coil 77 is connectable to a source of power 74' with reversible polarities for changing the propagation direction of the travelling wave. The modulator further comprises a cathode 78 and two anodes 79 and 80 to sustain the gas discharge.

The two compensations employed according to the invention in combination are accomplished by adjusting the position of the mirror 64 back and forth in the direction of the arrow 81 with the aid of the piezoelectric device 65 in response to temperature variations. The other compensation is accomplished by alternating the field direction of the modulator 74 as described. Due to the repeated reversing of the field direction of the modulator 74, the travelling wave will repeatedly propagate in opposite directions. Thus, when the travelling waves 63 in FIG. 4 propagate in the counterclockwise direction as indicated in full lines, the beam 69 will be coupled out. On the other hand, when the travelling wave propagates in the clockwise direction, the beam 72 shown in dashed lines in FIG. 4 will be coupled out and vice versa.

Figure 5:
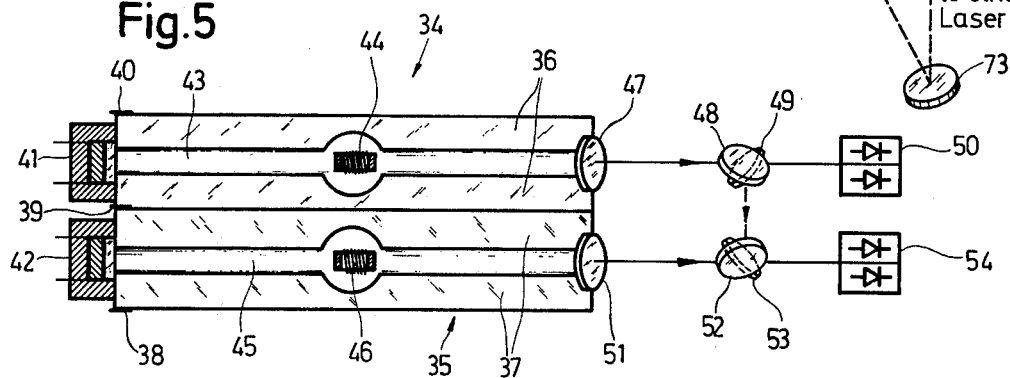
FIG. 5 is a side view similar to that of FIG. 2, but showing further details.

FIG. 5 illustrates a side view of a laser device similar to that of FIG. 2, however, showing further details. The same elements are designated by the same reference numerals. The adjustable mirror devices 41, 42 correspond to the one illustrated in more detail in FIG. 6.

The present laser gyroscopes employing $CO_2$ wave guide laser or solid state lasers may be manufactured in a rather economic manner, and are therefore well suited for use in missiles or the like having a short flight duration and requiring the use of the laser gyroscope but once. Under these circumstances the requirements for high precision and continuous duty drift are somewhat lower.

Due to the use of two separate lasers arranged one above the other, the invention provides the advantage that only one wave travels in each laser so that any disadvantages are eliminated which might occur, when only one laser is used where one of the two waves travelling in the same amplifying medium may be cancelled due to the strong interaction between the two travelling waves propagating in opposite directions. Similar considerations apply where two solid state laser devices are employed as taught herein, one above the other, since the solid state character of the laser medium causes a homogenous line broadening and thus a very strong coupling between the two waves travelling in the same amplifying medium.

Another advantage of the invention is seen in that due to the immediate closeness of the two laser devices to each other, a good thermal contact is provided therebetween so that deformation differences resulting from temperature variations are small to begin with and in addition the two combined compensations employed according to the invention supplement each other in eliminating the effects of such deformations of the resonators or trajectories.

Although the invention has been described with reference to specific example embodiments, it will be appreciated, that it is intended to cover all modifications and equivalents within the scope of the appended claims.

What is claimed is:

1. A laser gyroscope comprising a first ring laser device and a second separate ring laser device arranged in immediate proximity to each other to assure an optimal temperature contact between the two ring laser devices, each laser device including respective resonator means, temperature sensing means secured to said laser devices to sense any temperature variations in said laser devices, each of said laser devices further comprising first temperature variation compensating means and second compensating means, said first temperature variation compensating means being responsive to said temperature sensing means for tuning the corresponding resonator means in response to temperature variations, and alternating switch means operatively connected to said second compensating means for repeatedly changing the direction of travel of the laser beams in said first and second laser devices, whereby trajectory differences in said first and second ring laser devices are compensated and at any one instant the laser beam in one laser device travels in one direction and the laser beam in the other laser device travels in the opposite direction.

2. The laser gyroscope according to claim 1, wherein said first temperature variation compensating means comprise a temperature responsive piezoelectric device.

3. The laser gyroscope according to claim 1, wherein said second compensating means comprise loss modulators.

4. The laser gyroscope according to claim 1, wherein said first and second ring laser device are $CO_2$ wave guide lasers.

5. The laser gyroscope according to claim 1, wherein said first and second ring laser devices are solid state guide lasers.

6. The laser gyroscope according to claim 1, further comprising thin layers of material having a high temperature stability, whereby said ring laser devices are sandwiched between said thin layers.

7. The laser gyroscope according to claim 6, wherein said temperature sensing means are secured to said thin layers.

8. The laser gyroscope according to claim 1, wherein said first and second ring laser devices are solid state wave guide lasers, said gyroscope further comprising thin layers of material having a high temperature stability and a substrate of material also having a high temperature stability, said solid state ring lasers being constructed as integrated optical structures and sandwiched between said thin layers which in turn are secured to said substrate.

9. The laser gyroscope of claim 3, wherein said loss modulator comprises a Faraday cell.

10. In a laser gyroscope comprising a first ring laser device and a separate second ring laser device arranged in immediate proximity to each other to assure an optimal temperature contact between the two ring laser devices, each laser device including respective resonator means, each said laser device being arranged to permit waves to travel in only one direction in the respective device, the improvement comprising first and second error compensating means arranged for cooperating with said first and second ring laser devices respectively.

11. The laser gyroscope according to claim 10, wherein each of said first and second error compensating means comprises piezoelectric means for tuning the resonator means of the respective ring laser, said gyroscope further comprising temperature sensing means operatively connected to said piezoelectric means for tuning said resonator means in response to temperature variations.

12. The laser gyroscope according to claim 10, wherein each of said first and second error compensating means comprises modulator means and respective alternating switching means connected to said modulator for periodically changing the direction of travel of the laser beam in the respective resonator whereby the laser beam in one laser device travels in one direction while the laser beam in the other laser device travels in the opposite direction and vice versa.

13. The laser device according to claim 10, wherein both laser devices comprise $CO_2$ wave guide lasers.

14. The laser device according to claim 10, wherein both laser devices comprise solid state wave guide lasers.

15. The laser device according to claim 14, wherein said solid state laser devices are constructed as integrated optical devices.

* * * * *

UNITED STATES PATENT OFFICE
CERTIFICATE OF CORRECTION

Patent No. 4,035,081          Dated July 12, 1977

Inventor(s) Gunther Sepp et al.

It is certified that error appears in the above-identified patent and that said Letters Patent are hereby corrected as shown below:

Column 8, line 21, before "guide" insert -- wave --.

Signed and Sealed this

Eleventh Day of October 1977

[SEAL]

Attest:

RUTH C. MASON
Attesting Officer

LUTRELLE F. PARKER
Acting Commissioner of Patents and Trademarks